Patented Mar. 10, 1925.

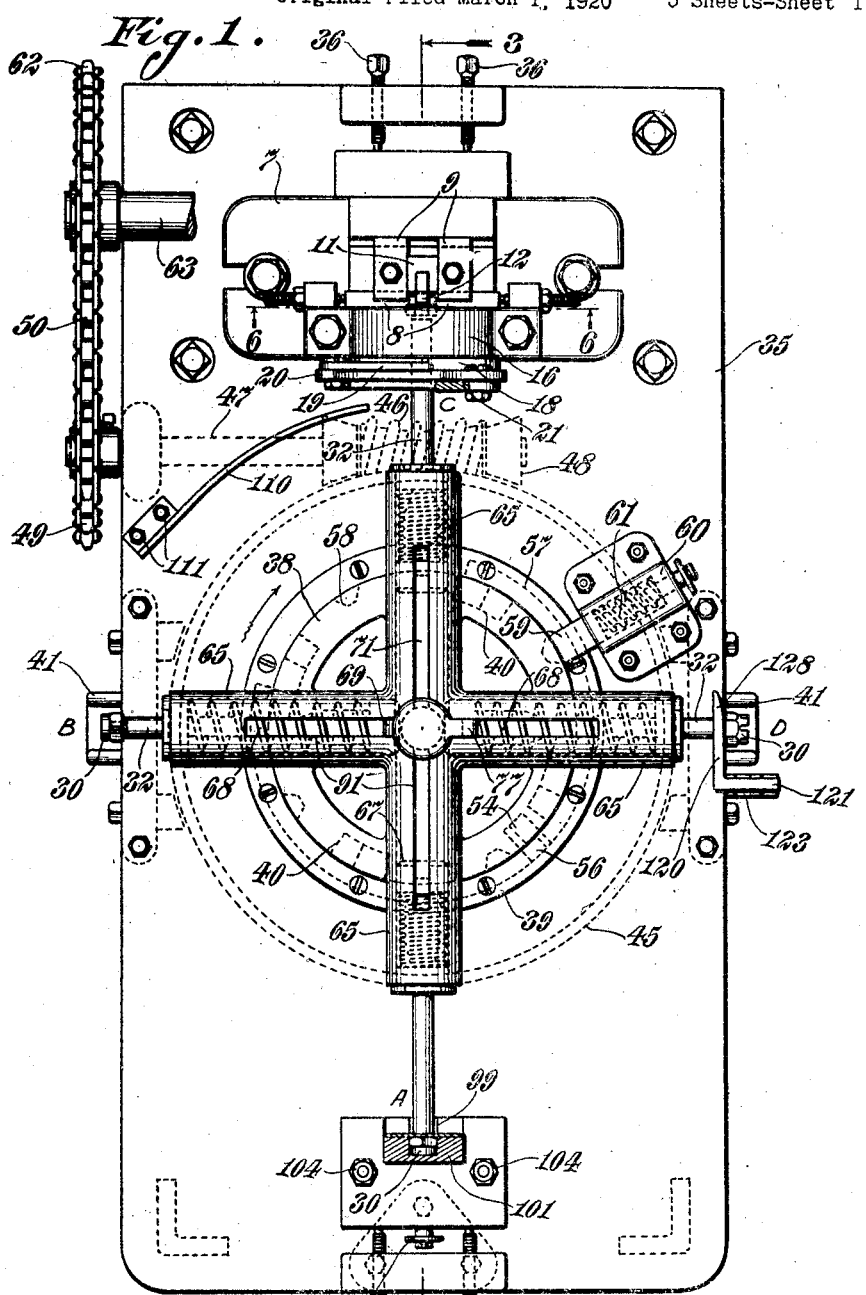

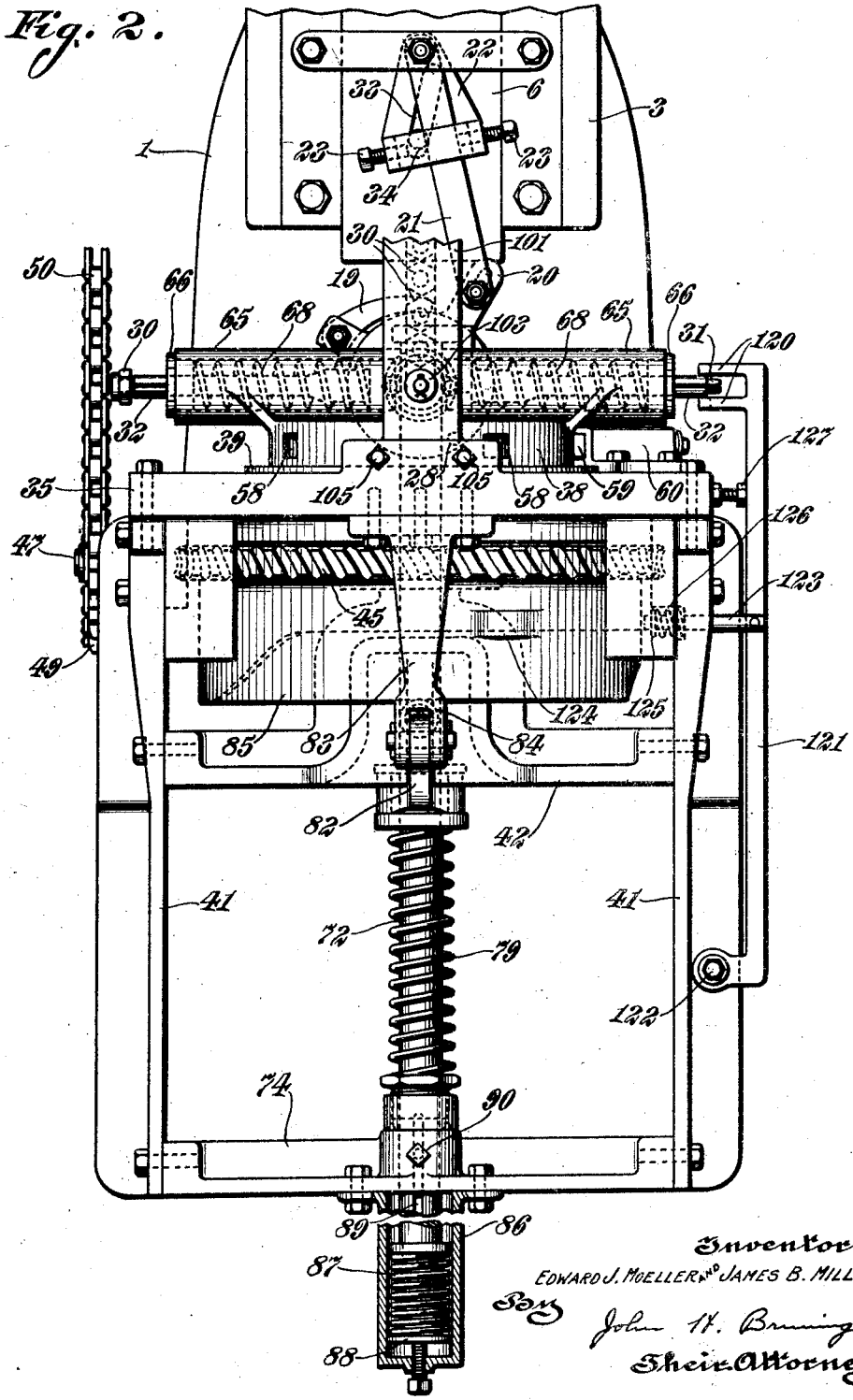

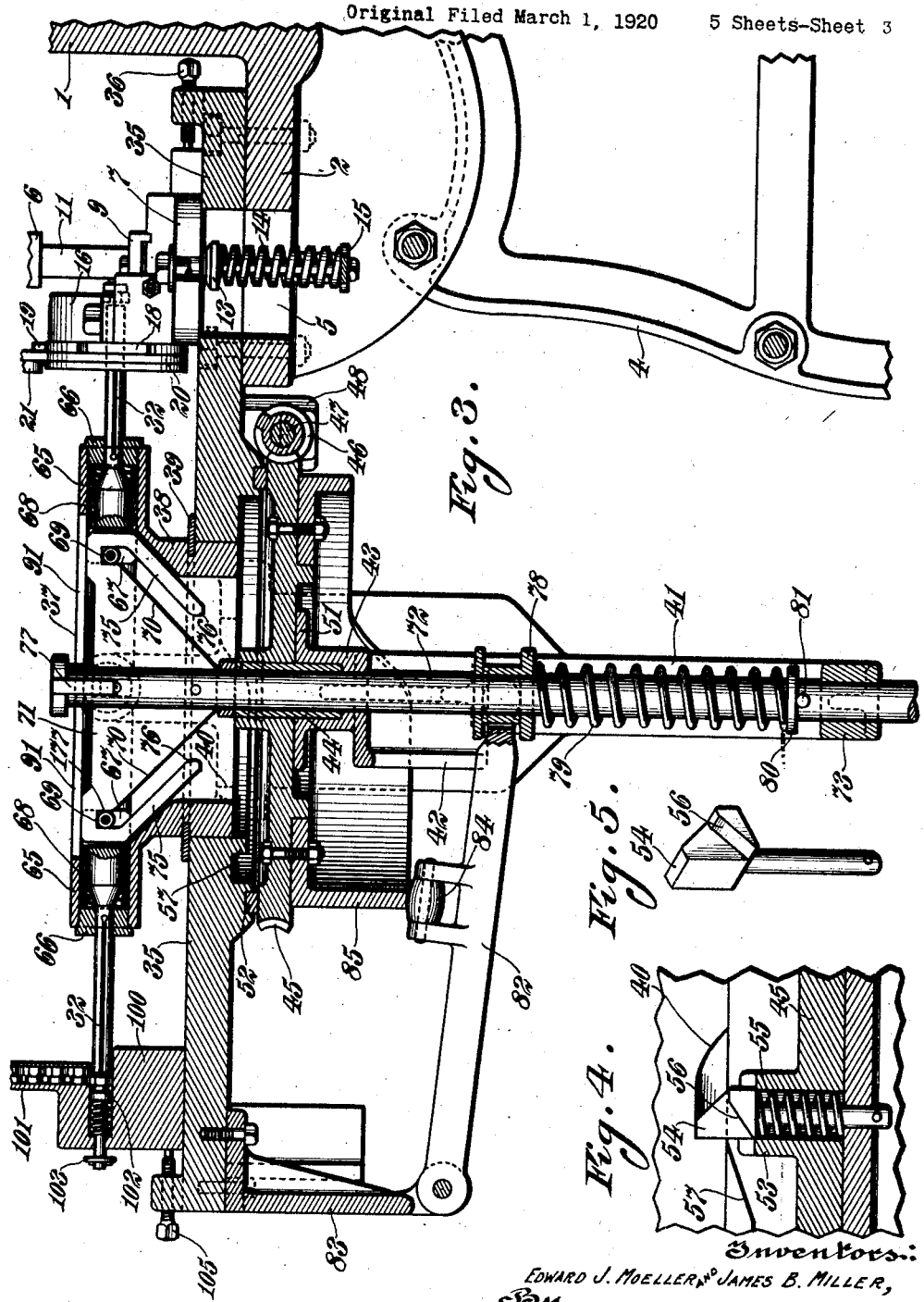

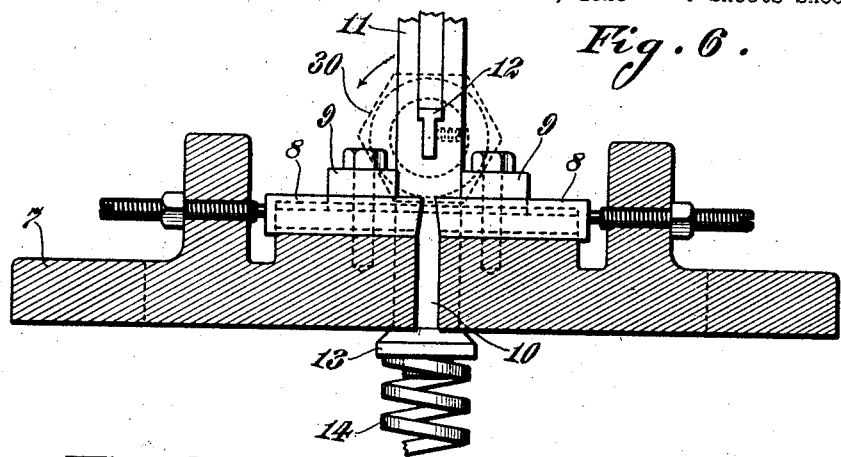
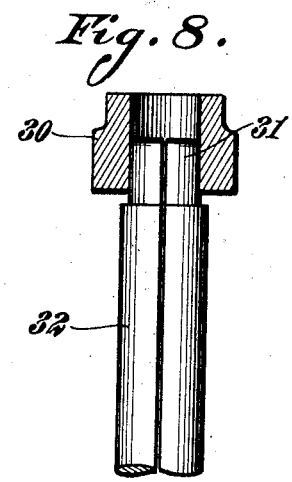
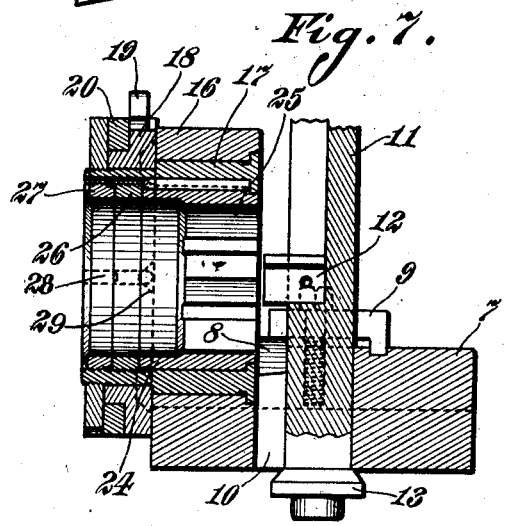
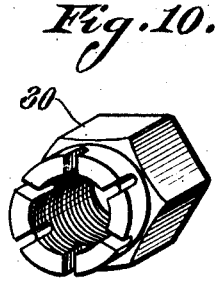
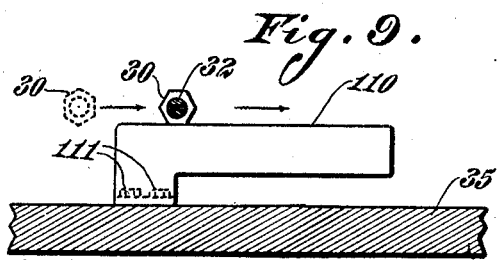

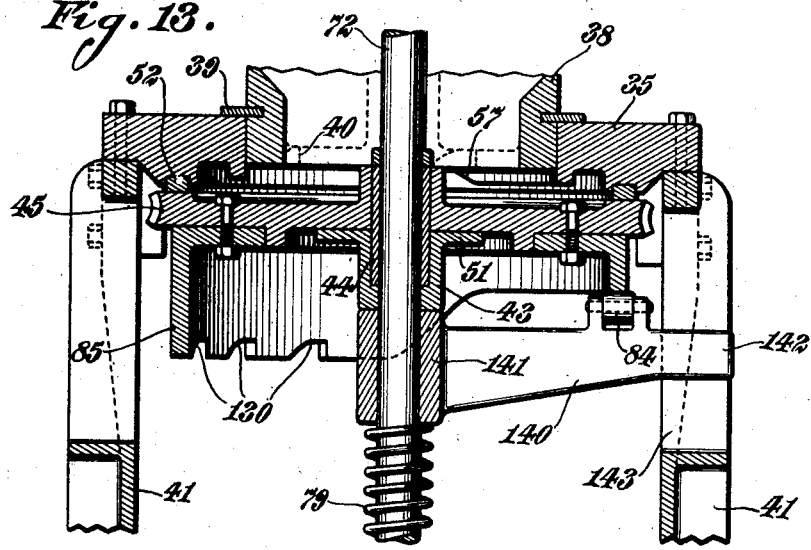
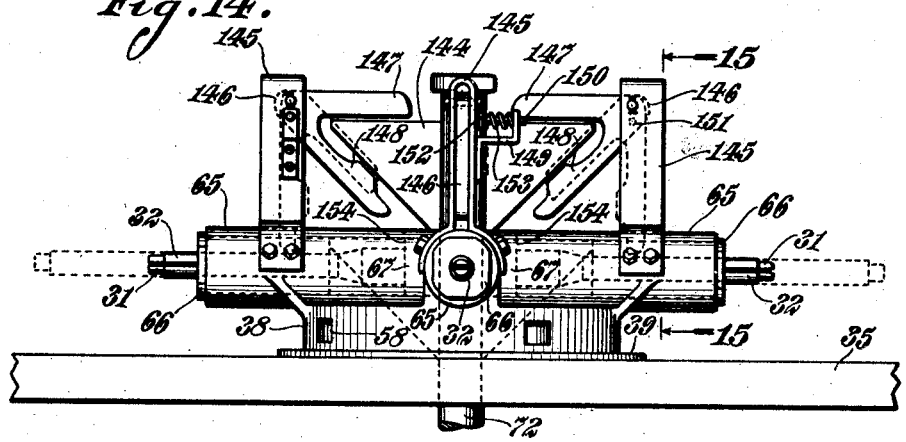
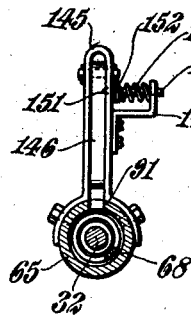
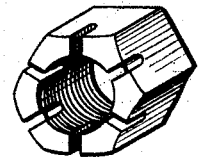
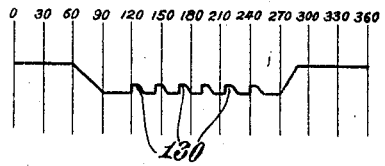

1,528,940

UNITED STATES PATENT OFFICE.

EDWARD J. MOELLER AND JAMES B. MILLER, OF ST. LOUIS, MISSOURI.

NUT-CASTELLATING MACHINE.

Application filed March 1, 1920. Serial No. 362,340. Renewed June 22, 1923.

*To all whom it may concern:*

Be it known that we, EDWARD J. MOELLER and JAMES B. MILLER, citizens of the United States, and residing at St. Louis, Missouri, have invented the new and useful Improvement in Nut-Castellating Machines, of which the following is a specification.

This invention relates to machines adapted more particularly for the castellation of nut blanks.

Castellated nut blanks are of two types, namely, one type which has a circular crown turned down slightly below the inside diameter of the hexagon, and the angular crown type in which the crown is left angular. The castellation of such blanks by punching operation is generally a difficult operation due to the excessive wear on the punch and die set. Where the punch and die are extraneous of the holder for the blank, the crown of the blank can be placed between the punch and die. This requires merely the shifting of the holder during the successive castellating operations on the blank where the crown is circular; such an operation is not, however, possible with angular crown blanks.

One of the objects of this invention, therefore, is to provide a machine which is adapted for the castellation of all types of nut blanks, whether having circular crowns or angular crowns.

Another object is to provide a machine which will be automatic in its operation so as to take the blanks from a source of supply and automatically perform the castellating operations thereon.

Another object is to provide improved supply mechanism adapted to permit selection of the blanks from a source of supply and transfer of the same to the castellating mechanism.

Another object is to provide mechanism for alining misplaced blanks so as to insure their proper positioning with respect to the castellating mechanism.

Another object is to improve the construction and operation of the blank castellating mechanism so as to adapt it for nuts of different sizes and types.

Another object is to provide ejecting mechanism adapted to eject the blanks after the castellating operations have been performed thereon.

Another object is to provide retaining mechanism for the nut blanks which is arranged to place the nuts in proper cooperative relation with the several mechanisms of an automatic nut blank castellating mechanism.

Further objects will appear from the detail description taken in connection with the accompanying drawings, in which:

Figure 1 is a plan of a machine embodying this invention;

Figure 2 is a front elevation, partly in section;

Figure 3 is a section on the line 3—3, Figure 1;

Figure 4 is an enlarged sectional view showing detail of the mechanism for driving the turret.

Figure 5 is a perspective view of the pawl;

Figure 6 is a section on the line 6—6, Figure 1;

Figure 7 is an enlarged section of the nut holder taken on the line 3—3, Figure 1;

Figure 8 is a detail of the nut retainer;

Figure 9 is a detail of the nut alining element;

Figure 10 is a perspective view of one form of nut;

Figure 11 is a perspective view of another form of nut;

Figure 12 is a diagram of a special form of cam;

Figure 13 is a view similar to Figure 3, but showing another embodiment of this invention;

Figure 14 is a detail elevation of Figure 13; and

Figure 15 is a section on the line 15—15, Figure 14.

Referring to the accompanying drawings, the mechanism illustrated in the embodiments of this invention is particularly designed to be placed on a punch press, although it will be understood that the mechanism may have operating mechanism as a part thereof apart from any punch press.

In the drawings, 1 designates the yoke, 2, the table, and 3, the head of any suitable punch press, all of which may be supported on a suitable frame 4. The table of the punch press is apertured as shown at 5 and is furthermore perforated to receive bolts for attaching the mechanism thereto and guided in the head 3 is a ram 6. It will, of course, be understood that this ram has suitable mechanism for reciprocating the same and that suitable clutch mechanism is provided. Since, however, such details are well known in the art, further description is unnecessary.

Castellating mechanism.

Referring more particularly to Figures 1, 2, 3, 6, 7 and 8, 7 designates a base arranged to be attached to the punch press over the aperture 5 and adjustably mounted on this base are a pair of die elements 8 which are clamped in position by clamps 9 in order to position the cutting edges of the die elements over an aperture 10. A punch carrier 11 guided for movement in the base 7 has a projecting punch 12 arranged to co-operate with the die elements 8. This punch carrier rests upon a head 13 which is under the tension of a spring 14 supported by a stirrup 15. The punch carrier 11 is arranged to be operated by the ram 6 so as to cause engagement of the punch with the die, while this punch carrier is returned by the spring 14.

Mounted in a bearing 16 on the base 7 is a carrier 17 which has secured thereto a ratchet 18 engaged by a pawl 19 on a pawl carrier 20, which is in turn connected with an oscillating lever 21 pivoted on the head 3. Pivoted on the head 3 and at the point of oscillation of the lever 21, is a plate 22 provided with a cam 33 in which works a cam roll 34 on the ram 6. This plate 22 is provided with set screws 23 forming tappets arranged to engage the arm 21. With this construction, upon reciprocation of the ram, the carrier will be rotated step by step in timed relation with the reciprocation of the punch.

Arranged within the carrier 17 and keyed thereto is a nut blank holder 24 having an angular portion 25 corresponding to the contour of the nut blank to be castellated. This holder is detachably and interchangeably retained in position by a clamping nut 26 and a lock nut 27. It will be understood that the teeth of the ratchet correspond in number to the shape of the nut to be castellated and that suitable means is provided for retaining the carrier in its position of adjustment, such as a spring pressed plunger 28 adapted to take into recesses 29 in the ratchet.

When a nut blank 30 is placed upon the reduced end 31 of a split retainer 32 and the blank is inserted endwise into the holder 24, the crown of the nut will project beyond the holder and will rest upon the die elements 8 and with the punch interiorly of the nut blank, as shown in Figure 6. If now the ram is started to reciprocate, the punch will move outwardly and in cooperation with the die, will punch castellate the crown of the blank. As the punch rises with the ram, the latter will rotate the carrier 17 and the holder therein through the proper angle between the nut faces, and as the punch again descends, it will punch castellate in the next position. In this way, the entire circumference of the crown is castellated, and after complete castellation, the castellated nut can be withdrawn by the retainer 32, which has a yielding gripping connection with the nut, but permits the nut to be rotated thereon during the castellating operation.

The turret.

Referring to Figures 1 to 5 inclusive, the base 7 is mounted on a sub-base 35 which is bolted to the table 2 and which is provided with set screws 36 for accurately positioning the base 7 thereon. Mounted on the sub-base or frame 35 is a turret 37, which has a hub 38 bearing in the frame and retained in position by plates 39 entering an annular recess in the hub and secured to the frame. The hub has four recesses 40 forming teeth for engagement by a pawl hereinafter to be described. The frame 35 has secured thereto downwardly extending legs 41 which support a bracket 42, provided with a bearing 43 for a sleeve 44, on which is journalled a worm wheel 45 with which meshes a worm 46 on a shaft 47, supported in bearings 48 on the frame 35 and provided with a sprocket 49 connected by a chain 50 with a similar sprocket 62 on a shaft 63 on the punch press. The worm wheel 45 rests upon a flange 51 on the bearing 43 and is steadied by a hardened ring 52 arranged in a recess in the frame 35 and engaging the rim of the worm wheel.

The worm wheel 45 has a boss 53 in which is guided a pawl 54 normally pressed upwardly by a spring 55 and adapted to engage the teeth 40 in the hub 38 of the turret. The pawl 54 has a cam lug 56 in the path of an annular cam 57 projecting downwardly from the frame 35 adjacent the hub 38. The recess of the cam extends for a little over ninety degrees as shown in Figure 1, while the depressing rise extends for the remainder of the circle. As the worm wheel 45 is driven in the direction of the arrow, Figure 1, it will carry the pawl 54 with it. This pawl is, however, retained out of engagement with the hub 38 for about three-fourths of a revolution and, therefore, moves idly with the worm wheel. As soon, however, as the cam lug 56 reaches the recess in the cam, its spring 55 will snap it into the next recess or tooth 40 on the turret hub and, thereafter, the turret is carried with the worm wheel. At the end of a quarter revolution, however, the cam lug 56 engages the cam 57 retracting the pawl 54 out of engagement with the turret hub, so that this turret hub will then remain stationary after having passed through a quarter revolution, while the pawl continues in its movement with the worm wheel through another three quarters of a revolution.

In order to accurately position the turret in its four different positions, the turret hub is provided with conical recesses 58 arranged for engagement by the cone-pointed end of a plunger 59 movable in a bearing 60 on the frame 35 and impelled by a spring 61. This spring pressed plunger will snap into and out of engagement with the recesses so as to locate and lock the turret accurately in its different positions.

Blank retainers.

The turret is provided with tubular arms 65 having bearings 66 in the ends thereof, in which are guided the blank retainers 32, there being four of these retainers, each retainer being slit, so as to form yielding gripping devices for the blanks. Each barrel 65 has sliding therein a forked head 67 between which and the bearing is a spring 68, which tends to normally move the retainers to retracted position inside of the barrels, as shown to the right and left in Figure 1. Each head 67 has a cam roll 69 arranged for engagement by cam faces 70 on a head 71 fixed to a shaft 72 sliding in the sleeve 44 and a bearing 73 on a cross piece 74 connecting the legs 41.

The cam head 71, as shown in Figure 3, has two wings, and each wing has an element 75 arranged to form an outer cam face, the wings, however, terminating in rounded ends 76, for a purpose to be hereinafter described, and it will be noted that the cam thus formed has a straight portion 177 which positively locks the head 67 and the retainers in their outward positions against the tensions of their springs 68. The shaft 72 has an overhanging lug 77 at right angles to the head 71 and projecting to the right, Figure 1, so as to take behind the retracted heads when in the right position for a purpose to be hereinafter described.

The shaft 72 has loose thereon a collar 78 bearing on one end of a spring 79 encircling the shaft, the other end of the spring bearing against a collar 80 retained on the shaft by a cross-pin 81. The collar 78 is engaged by a forked arm 82 pivoted on a bracket 83 on the frame 35 and provided with a cam roll 84 engaging a cam 85 fixed to and moving with the worm wheel 45.

The shaft 72 extends downwardly into a tubular support 86 suspended from the cross-piece 74, which carries a strong spring 87 bearing at its lower end against an adjustable abutment 88 and at its other end against a head on the shaft 72. The shaft 72 has a key way 89 engaged by a guide-pin 90 so as to prevent the shaft from turning.

The spring 87 is of greater tension than the spring 79 so that it will overcome the same. The turret is furthermore slotted as shown at 91 so that the head 71, as well as the lug 77, can pass freely into and out of the turret.

During the operation of the machine, the movement of the cam 85 with the worm wheel will operate in connection with the springs 79 and 87 to reciprocate the shaft 72. The cam rise of the cam 85 is, however, so arranged with reference to the cam rise on the cam 57 that the head 71 will be reciprocated only while the turret is stationary. When the head 71 is moved up to permit retraction of the retainers 32 by the springs 68 from extended position, such retraction is positively insured by the elements 75. In the highest position of the head, however, the elements 75 will pass out of mesh and cooperation with the cam rolls 69 altogether and the turret can then be moved through a quarter of a revolution as the head is at this time entirely clear of and above the turret. When the turret has now been moved through a quarter of a revolution, the head will again descend under the action of its cam 85 so as to retract the next set of arms, while the lug 77 will take behind the head 67 on the right retainer, Figure 1, to positively prevent extension of that retainer. The head and the turret are thus moved alternately.

The loading mechanism.

Referring to Figures 1, 2 and 3, mounted in the end of the frame 35 is a base 100, which has mounted thereon or formed thereon a raceway 101 for a stack of blanks, and at the termination of the raceway and in the path of movement of the retainers 32 is a slot 99 permitting passage underneath the raceway of these retainers. Arranged underneath the raceway is a spring pressed plunger 102, having a stop 103 for positioning the head of the plunger slightly behind the blank which is dropped down from the raceway, it being understood that the transverse slot underneath the raceway extends somewhat back so as to permit free passage of the tips of the retainers. The base 100 is secured by bolts 104 and is accurately adjusted by set screws 105.

When one of the retainers is positioned opposite the raceway and is then moved outwardly by the head 71, the point of the retainer enters the blank which has left the raceway so as to grip the same internally. In order to permit such firm gripping action, the plunger 102 is provided, which under the tension of its spring provides a yielding abutment. Accordingly a firm engagement of the nut blank with the retainer is insured. However, if there is a defective or misplaced blank, the spring pressed plunger will give and thus prevent breakage.

When the head 71 now again rises, the retainer will be retracted, carrying the blank with it and thereafter the turret is moved from position A to position B. At the position A, therefore, the retainer is loaded with a blank.

The blank alining mechanism.

Referring to Figures 1 and 9, mounted on the frame 35 between the positions B and C is a circumferentially extending plate 110. This plate is detachably connected with the frame by screws 111 and is in such a position that its upper edge will be in the path of the angular portion of a nut blank when on the retainer in its retracted position B. The upper edge of this part is at such a height that a flat face of a blank will slide on it. If, therefore, a nut is in such a position that the lower flat face is not horizontal, it will be tipped by the plate and made horizontal in order that the nut may properly cooperate with the angular portion 25 of the holder 24. It will, of course, be understood that on account of the spring action of the retainer, the blank is frictionally held in the position that it is adjusted by the plate 110.

It will, therefore, be seen that when the retainer moves from position B to position C, the blank will be straightened for proper cooperative relation with the blank holder so that when the blank arrives at position C, while it will have left the straightener 110, it will be properly alined and straightened. In position C, the retainer is again extended, causing the blank to enter the blank holder with its crown on the die and with the punch inside of the blank. In this position, the blank is held while it is castellated and is then withdrawn.

Blank ejecting mechanism.

After the blank has been castellated and withdrawn from the castellating mechanism so that the retainer is fully withdrawn, this retainer is moved to position D. At position D is an ejecting device, comprising two prongs 120 of a fork mounted on an arm 121, pivoted at 122 on one of the legs 41 and provided intermediate its ends with a stem 123, the end of which is in the path of a cam lug 124 on the cam 85. The stem 123 has fixed thereto a collar 125 against which bears one end of a spring 126 bearing at its other end against the leg 41. This spring normally holds the arm 121 in engagement with an adjustable stop 127 on the frame 35. The fork prongs 121 have beveled ends 128 in the path of the retainers 32, as shown in Figure 1.

When the fork 120 is positioned by the stop 127, as shown in Figures 1 and 2, the beveled ends thereof are slightly beyond the path of the shoulder formed by the retainer 32 and its tip. At this time, the retainer will be securely locked against extension by the lug 77 taking behind the head 67, as shown in Figures 1 and 2. Accordingly, when the retainer moves from position C to position D, the fork will straddle the retainer immediately behind the blank. As, however, the turret comes to rest with the parts in the position shown in Figure 1, the cam 85 in continuing its movement with the worm wheel will cause, by the engagement of the cam lug 124 with the stem 123, outward movement of the arm 121, thereby forcibly retracting the nut from the retainer and this nut now can drop into a suitable receptacle or on a conveyor. The retainer can now pass on with the turret from position D to position A.

Castellation of angular crown nut blanks.

In castellating the form of blank illustrated in Figure 10, this blank can remain in the same axial position, due to the fact that the crown is circular and accordingly this crown can simply rotate on the die elements 8. Such operation is not, however, possible with the form of nut shown in Figure 11, which has an angular crown. In the castellation of such a blank, it is necessary that the blank be retracted intermittently during each punching operation so that its face will lie within the blank holder 24, Figure 7.

In accordance with this invention, therefore, as illustrated in Figures 12 and 13, the cam 85 is provided with a series of cam recesses 130 cooperating with a roll 84, the number of these cam recesses corresponding to the number of castellating notches or recesses in the nut. The depth of these cam recesses is sufficient so as to cause a sufficient upward movement of the head 71 so that the crown of the angular nut will be retracted inside of the holder 24, Figure 7, in order to clear the die elements 8. It will be understood that when castellating such an angular crown nut, the die elements 8 are replaced by elements whose upper cutting edges and faces are level with the bottom angular face of the angular portion 25 of the blank holder 24.

In the operation of this embodiment, therefore, when the given retainer arrives at position C, Figure 1, and positions the nut blank inside of the holder and with the crown of the angular nut (Figure 11) on the die elements 8, after the operation of the punch and after the punch has been retracted, the cam roll 84 will drop into the first recess 130, thereby causing the retainer to be retracted sufficiently, carrying the blank with it, so as to cause the blank to be retracted from the die and inside of the angular portion 25 of the holder 24, while still being maintained in that angular portion; thereafter the holder is rotated through a step to place the next blank face opposite the die; the cam roll 84 then again moves on the next rise of the cam 85 so as to project the blank again beyond its holder and place the crown again on the die; the punch then again descends to punch castellate the projecting face of the crown so positioned. This operation is successively repeated for a number of sub-operations until the entire crown has been castellated. The cam roll 84 then leaves the rise of the cam 85, thereby causing the nut blank to be completely withdrawn from the holder of the castellating mechanism.

*Embodiments of Figures 13 to 15 inclusive.*

Referring to Figures 13 and 14, the cam roll 84 is in this case mounted upon an arm 140 having a hub 141 sliding upon the shaft 72 and resting on the spring 79. This arm has a projection 142 guided in a slot 143 on one of the legs 41, so as to keep the arm 140 from turning. The heads 67 of the retainers 32 are engaged by the cam head 144 on the shaft 72, it being understood that the retainers and their heads are guided in the arm 65 of the turret and that springs, such as 68, (Figure 3) are provided for acting normally to retract the retainers as in the embodiment previously described, it being noted in this connection that except as hereinafter described, the construction and operation of this embodiment, Figures 13, 14 and 15 is similar to that heretofore described.

Mounted on opposite tubular arms 65 are brackets 145, each comprising a pair of spaced lugs between which is pivoted a bell crank lever 146, having arms 147 and 148 arranged to embrace the projecting portion of the head 144. Mounted to slide in one of the arms and a bracket 149 attached thereto is a plunger 150 having a rounded end, arranged to co-operate with a rounded depression 151 in the bell crank lever and provided with a collar 152 fixed thereto against which bears a spring 153. Each head 67 is provided with an upwardly extending lug 154 sliding in the slot 91 in the tubular arm 65 of the turret.

As the head 144 is retracted to dotted position, Figure 14, the engagement of this head with the arm 148 will cause the tip thereof to move into the path of the lug 154, which follows immediately behind it. Accordingly, as this head is again raised, its engagement with the arm 147 will cause positive retraction of the retainer by the engagement of the tip of the arm 148 with the lug 154. Furthermore where the cam 85 is provided with the recesses 130, upon each slight elevation of the head 144, the engagement of the head with the arm 147 will cause intermediate retraction of the blank retainers 32 during the castellation of an angular crowned nut, as in the previous embodiment heretofore described. The purpose of the plunger 150 is to lock the bell crank levers 146 in normal positions, so that rotation of the turret will permit ready alinement of the head 144 with the pairs of bell crank levers 146.

*Résumé of operations.*

Referring more particularly to Figures 1, 2, 3, 6, 7 and 12, the machine is set in operation, it being understood that the shaft 47 is operated in timed relation with the shaft 63 operating (or driven in timed relation with) the punch, so as to cause the punch to execute a series of operations corresponding in number to the faces of the nut blanks to be castellated, a complete cycle of operations will be as follows:

When the turret moves from position D to position A, after a given retainer is located in a position opposite the blank raceway 101, the retainer is moved outwardly, thereby causing the tip thereof to enter and grip the last nut in the raceway. This retainer is now retracted carrying the nut with it inwardly, while the stack of nuts in the raceway again drops down so as to again position a blank at the bottom of the raceway.

The movement of the retainer from position A to position B is really an idle one because at this time there is no operation performed on the nut. As, however, the retainer moves from position B to position C, the blank is alined and straightened so as to present a lower face in a horizontal plane, it being understood that the retainer remains retracted at this time. When the retainer arrives at position C, therefore, it will while still retracted have the blank firmly gripped therein and in a position with its lower face horizontal.

At position C, the retainers move outwardly under the yielding action of the actuator and position the blank inside of the holder of the castellating mechanism with the crown of the blank on the die. Where the nut to be castellated is a circular crowned one, as illustrated in Figure 10, the retainer remains stationary while the successive castellating operations are performed upon the nut. Where the blank is one having an angular crown and where accordingly a stepped cam 85 is provided, the blank is successively retracted and then shifted while retracted during each punching operation. After completion of the castellating operation, the retainer is again retracted When the retainer moves from position C to position D, at which time it is retracted, the retainer with the castellated blank thereon will move into cooperative relation with the ejector mechanism and as the actuating head again moves down, it will first operate to lock the retainer against outward movement and will then cause the ejector to move forcibly outward, thereby stripping the blank from the retainer. This completes the cycle of operations.

It will, therefore, be seen that the invention accomplishes its objects. The machine is entirely automatic in its action and certain and positive so as to insure complete operation for the production of complete castellated nuts. The supply mechanism is such as to permit for automatic discarding of imperfect blanks and prevent clogging or breakage. The alining or straightening mechanism operates to straighten any misplaced nuts. The ejecting mechanism operates in a positive manner so as to eject the castellated blanks as completed by the castellating mechanism, but this ejecting mechanism is so constructed as to prevent interruption or breakage.

The retaining mechanism is arranged not only to operate in timed relation with the castellating mechanism, but it is also so constructed by the yielding connections that breakage is avoided. This retaining and placing mechanism is so constructed that with the provision of the replaceable punch and die and holder, nuts of various sizes and types can be castellated. The machine can be readily changed from circular crown to angular crown nuts by the simple replacement of a cam which is detachably bolted in position and, therefore, permits the machine to be readily converted.

It is obvious that various changes may be made in the details of construction without departing from the spirit of this invention; it is, therefore, to be understood that this invention is not to be limited to the specific details shown and described.

Having thus described the invention, what is claimed is:

1. A machine of the character described, comprising, mechanism adapted to punch-castellate a blank, a blank retainer, operating means for said retainer, and means for automatically controlling the operation of said retainer in timed relation with said mechanism adapted to position a blank in cooperation with said mechanism, and withdraw the blank after the completion of the castellating operation.

2. A machine of the character described, comprising, mechanism adapted to punch-castellate a blank, a blank retainer, operating means for said retainer, and means for automatically controlling the operation of said retainer in timed relation with said mechanism, adapted to position a blank in cooperation with said mechanism, maintain said blank therein during the castellating operation thereon, and withdraw the blank after the completion of the castellating operation.

3. A machine of the character described, comprising, mechanism adapted to punch-castellate a blank, a blank holder, a blank retainer, operating means for said retainer, and means for automatically controlling the operation of said retainer in timed relation with said mechanism adapted to place the blank into said holder for castellation and withdraw it from said holder at the completion of the castellation.

4. A machine of the character described, comprising, mechanism adapted to punch-castellate a blank, a rotatable blank holder adapted to position a blank for operation by said mechanism, a blank retainer, operating means for said retainer, and means for automatically controlling the operation of said retainer in timed relation with said mechanism, adapted to place the blank into said holder for castellation and withdraw it from said holder at the completion of the castellation.

5. A machine of the character described, comprising, mechanism adapted to punch-castellate a blank, a rotatable blank holder, and means for shifting said holder while a blank is positioned therein, a blank retainer, operating means for said retainer, and means for automatically controlling the operation of said retainer in timed relation with said mechanism, adapted to place the blank into said holder for castellation and withdraw it from said holder at the completion of the castellation.

6. A machine of the character described, comprising, mechanism adapted to punch-castellate a blank, a rotatable blank holder adapted to position a blank for operation by said mechanism, a blank retainer adapted to movably retain a blank thereon, operating means for said retainer, and means for automatically controlling the operation of said retainer in timed relation with said mechanism, adapted to place the blank into said holder for castellation and withdraw it from said holder at the completion of the castellation.

7. A machine of the character described, comprising, mechanism adapted to punch-castellate a blank, a rotatable blank holder, means for shifting said holder while a blank is positioned therein, a blank retainer adapted to rotatably support a blank thereon, operating means for said retainer, and means for automatically controlling the operation of said retainer in timed relation with said mechanism, adapted to place a blank into said holder and withdraw the same after the completion of the castellating operation.

8. A machine of the character described, comprising, nut blank castellating mechanism, means adapted to position a blank for operation by said mechanism, and means for successively retracting the blank.

9. A machine of the character described, comprising, nut blank castellating mechanism, means adapted to position a blank for operation by said mechanism, and means for successively retracting the blank in timed relation with said mechanism.

10. A machine of the character described, comprising, nut blank castellating mechanism, means adapted to position a blank for operation by said mechanism, and means for retracting the blank from said mechanism upon each operation thereof.

11. A machine of the character described, comprising, nut blank castellating mechanism, means adapted to position a blank for operation by said mechanism, means for shifting the blank, and means for retracting the blank.

12. A machine of the character described, comprising, nut blank castellating mechanism, means adapted to position a blank for operation by said mechanism, means for shifting the blank, and means for retracting the blank upon each shifting movement.

13. A machine of the character described, comprising, nut blank castellating mechanism, means adapted to position a blank for operation by said mechanism, and means for shifting and retracting the blank in timed relation with said mechanism.

14. A machine of the character described, comprising, nut blank castellating mechanism, means adapted to position a blank for operation by said mechanism, and means for shifting the blank and for retracting the blank from said mechanism during each operation thereof.

15. A machine of the character described, comprising, nut blank castellating mechanism, means adapted to place nut blanks into and out of position for operation by said mechanism, and means for operating said placing means for successively retracting the blank.

16. A machine of the character described, comprising, nut blank castellating mechanism, means adapted to place nut blanks into and out of position for operation by said mechanism, and means for operating said placing means for retracting the blank from said mechanism upon each operation thereof.

17. A machine of the character described, comprising, nut blank castellating mechanism, means adapted to place nut blanks into and out of position for operation by said mechanism, and means for successively shifting the blank and for retracting the blank upon each shift thereof.

18. A machine of the character described, comprising, nut blank castellating mechanism, a blank retainer, adapted to receive a blank from a source of supply, means for shifting said retainer to aline with said mechanism, means for operating the alined retainer to place the blank in position, and means for alining the blank while said retainer is shifted.

19. A machine of the character described, comprising, nut blank castellating mechanism, a blank retainer, adapted to receive a blank from a source of supply, means for shifting said retainer to aline with said mechanism, means for operating the alined retainer to place the blank in position, and means for rotating the blank on said retainer while it is shifted.

20. A machine of the character described, comprising, nut blank castellating mechanism, a blank retainer, adapted to receive a blank from a source of supply, means for shifting said retainer to aline with said mechanism, means for operating the alined retainer to place the blank in position, and a shifting element in the path of the blank while said retainer is shifted.

21. A machine of the character described, comprising, mechanism adapted to punch-castellate a blank, a rotatable blank holder, means for shifting said holder while a blank is positioned therein, a blank retainer adapted to rotatably support a blank thereon, means for operating said retainer to receive a blank from a source of supply and place the same into said holder, and means for rotatatively shifting a misplaced blank on said retainer.

22. A machine of the character described, comprising, nut blank castellating mechanism, a source of blank supply out of alinement with said mechanism, and means adapted to select a blank from said source and place the same into position for operation by said mechanism.

23. A machine of the character described, comprising, nut blank castellating mechanism, a source of blank supply, means adapted to select a blank from said source and place the same into position for operation by said mechanism, and means for alining the blank before it is placed in position.

24. A machine of the character described, comprising, nut blank castellating mechanism, a source of blank supply, means adapted to select a blank from said source and place the same into position for operation by said mechanism, and means for alining the blank during its transfer from said source to said mechanism.

25. A machine of the character described, comprising, nut blank castellating mechanism, a source of blank supply, a blank retainer, means for alining said retainer with said source and said mechanism, means for operating said retainer to select a blank, and means for operating said retainer to place the blank thereon in position for operation by said mechanism.

26. A machine of the character described, comprising, nut blank castellating mechanism, a source of blank supply, a blank retainer, means for alining said retainer with said source and said mechanism, means for operating said retainer to select a blank, means for operating said retainer to place the blank thereon in position for operation by said mechanism, and means for shifting a misplaced blank on said retainer.

27. A machine of the character described, comprising, nut blank castellating mechanism, a source of blank supply, a blank retainer, means for alining said retainer with said source and said mechanism, means for operating said retainer to select a blank, means for operating said retainer to place the blank thereon in position for operation by said mechanism, and means for shifting a misplaced blank on said retainer during its transfer from said source to said mechanism.

28. A machine of the character described, comprising, nut blank castellating mechanism, a blank retainer, ejecting means, and means for moving said retainer to aline successively with said mechanism and said ejecting means.

29. A machine of the character described, comprising, nut blank castellating mechanism, a source of blank supply, blank ejecting means, and a blank retainer movable successively to aline with said source, said mechanism and said ejecting means.

30. A machine of the character described, comprising, nut blank castellating mechanism, blank alining means, blank ejecting means, and a blank retainer movable successively to aline with said alining means, said mechanism and said ejecting means.

31. A machine of the character described, comprising, nut blank castellating mechanism, a source of blank supply, blank alining means, blank ejecting means, and a blank retainer movable successively to aline with said source, said alining means, said mechanism and said ejecting means.

32. A machine of the character described, comprising, nut blank castellating mechanism, a source of blank supply, blank ejecting means, a blank retainer movable successively to aline with said source, said mechanism and said ejecting means, and means for intermittently retracting said retainer while in alinement with said mechanism.

33. A machine of the character described, comprising, nut blank castellating mechanism, blank alining means, blank ejecting means, a blank retainer movable successively to aline with said alining means, said mechanism and said ejecting means, and means for intermittently retracting said retainer while in alinement with said mechanism.

34. A machine of the character described, comprising, nut blank castellating mechanism, a source of blank supply, blank alining means, blank ejecting means, a blank retainer movable successively to aline with said source, said alining means, said mechanism and said ejecting means, and means for intermittently retracting said retainer while in alinement with said mechanism.

35. A machine of the character described, comprising, nut blank castellating mechanism, a blank retainer, means for alining said retainer with said mechanism, and means for intermittently retracting said retainer while alined with said mechanism.

36. A machine of the character described, comprising, nut blank castellating mechanism, a source of blank supply, a blank retainer movable successively to aline with said source and said mechanism, and means for intermittently retracting said retainer while alined with said mechanism.

37. A machine of the character described, comprising, nut blank castellating mechanism, a source of blank supply, a series of blank retainers, and means for shifting said retainers adapted to aline one of said retainers with said source and the other retainers with said mechanism.

38. A machine of the character described, comprising, nut blank castellating mechanism, a source of blank supply, a series of blank retainers, means for shifting said retainers adapted to aline one of said retainers with said source and all the other retainers with said mechanism, and means for intermittently retracting said retainers while so alined.

39. A machine of the character described, comprising, nut blank castellating mechanism, a source of blank supply, blank ejecting means, a series of blank retainers, and means for shifting said retainers adapted to aline one of said retainers with said source, another of said retainers with said mechanism, and another of said retainers with said ejecting mechanism.

40. A machine of the character described, comprising, nut blank castellating mechanism, a source of blank supply, blank ejecting means, a series of blank retainers, means for shifting said retainers adapted to aline one of said retainers with said source, another of said retainers with said mechanism, and another of said retainers with said ejecting mechanism, and means for extending and retracting said retainers.

41. A machine of the character described, comprising, nut blank castellating mechanism, means adapted to position a blank for operation by said mechanism, and means for relatively moving the blank and said mechanism adapted to retract the blank from said mechanism upon each operation thereof.

42. A machine of the character described, comprising, nut blank castellating mechanism, means adapted to position a blank for operation by said mechanism, and means for relatively moving said blank and said mechanism adapted to shift and retract the blank in timed relation with said mechanism.

43. A machine of the character described, comprising, a die, a punch, a nut blank holder adapted to position a blank between said punch and said die, and means for relatively moving the blank with respect to said die adapted to place said blank and said die into and out of cooperative relation upon each operation of said punch.

44. A machine of the character described, comprising, a die, a punch, a nut blank holder adapted to position a blank between said punch and said die, and means for relatively moving the blank with respect to said die adapted to relatively shift the blank and said die and place the same into and out of cooperative relation upon each operation of said punch.

45. A machine of the character described, comprising, mechanism adapted to punch-castellate a blank, a blank retainer, and means for operating said retainer in timed relation with said mechanism, adapted to position a blank in cooperation with said mechanism.

In testimony whereof we affix our signatures this 5th day of January, 1920.

EDWARD J. MOELLER.
JAMES B. MILLER.